United States Patent
Veeravu et al.

(10) Patent No.: US 11,487,756 B1
(45) Date of Patent: Nov. 1, 2022

(54) INGESTING AND TRANSFORMING BULK DATA FROM VARIOUS DATA SOURCES

(71) Applicant: Target Brands, Inc., Minneapolis, MN (US)

(72) Inventors: Sanil Veeravu, Minneapolis, MN (US); Sara Waterman, Minneapolis, MN (US); Tom Anderson, Minneapolis, MN (US); Rajesh Tella, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 652 days.

(21) Appl. No.: 16/522,351

(22) Filed: Jul. 25, 2019

Related U.S. Application Data

(60) Provisional application No. 62/703,280, filed on Jul. 25, 2018.

(51) Int. Cl.
*G06F 16/24* (2019.01)
*H04L 67/141* (2022.01)
(Continued)

(52) U.S. Cl.
CPC ......... *G06F 16/24534* (2019.01); *G06N 5/02* (2013.01); *G06N 20/00* (2019.01); *H04L 67/141* (2013.01)

(58) Field of Classification Search
CPC .... G06F 16/24534; G06N 5/02; G06N 20/00; H04L 67/141
See application file for complete search history.

(56) References Cited

U.S. PATENT DOCUMENTS

| | | | |
|---|---|---|---|
| 6,731,990 B1* | 5/2004 | Carter | G05B 13/026 |
| | | | 700/52 |
| 8,751,436 B2* | 6/2014 | Lowry | G06Q 40/00 |
| | | | 706/52 |

(Continued)

OTHER PUBLICATIONS

APACHE Spark [online], "Running Spark on YARN," [retrieved on Aug. 24, 2017], retrieved from: URL<http://spark.apache.org/docs/latest/running-on-yarn.html>, 6 pages.

(Continued)

*Primary Examiner* — Alford W Kindred
*Assistant Examiner* — Cecile H Vo
(74) *Attorney, Agent, or Firm* — Fish & Richardson P.C.

(57) ABSTRACT

In some implementations, a method performed by data processing apparatuses includes receiving configuration data for a preconfigured data connector, including connection parameters, time interval parameters, and data transformation parameters. The connection parameters are used to establish a connection to a bulk data source. In response to determining that an amount of time has elapsed that corresponds to the time interval parameters, bulk data is retrieved from the bulk data source for a given time interval, and the retrieved bulk data is transformed in accordance with the data transformation parameters. Based on transforming the retrieved bulk data, a data metric is generated that condenses the retrieved bulk data. A predetermined predicted metric value is received from a prediction data source for the data metric for a time interval that corresponds to the given time interval, and the predicted metric value is stored with the measured metric value.

20 Claims, 6 Drawing Sheets

(51) Int. Cl.
*G06F 16/2453* (2019.01)
*G06N 20/00* (2019.01)
*G06N 5/02* (2006.01)

(56) References Cited

U.S. PATENT DOCUMENTS

| | | |
|---|---|---|
| 9,460,401 B2 | 10/2016 | Zeng et al. |
| 9,495,645 B2 | 11/2016 | Hughes et al. |
| 2015/0317589 A1 | 11/2015 | Anderson et al. |
| 2016/0299957 A1* | 10/2016 | A. C. .................... G06F 16/254 |
| 2017/0132520 A1 | 5/2017 | Burroughs et al. |

OTHER PUBLICATIONS

IBM Knowledge Center [online], "Lesson 3: Configuring generic connector," [retrieved on Jul. 25, 2019], retrieved from: URL<https://www.ibm.com/support/knowledgecenter/SSULQD_1.7.2/com.ibm.nz.hdp.doc/tt_de_lesson2.html>, 2 pages.

IBM Knowledge Center [online], "Lesson 5: Lesson 5: Using Fluid Query functions to query data," [retrieved on Jul. 25, 2019], retrieved from: URL<https://www.ibm.com/support/knowledgecenter/SSULQD_1.7.2/com.ibm.nz.hdp.doc/tt_de_lesson5.html>, 2 pages.

* cited by examiner

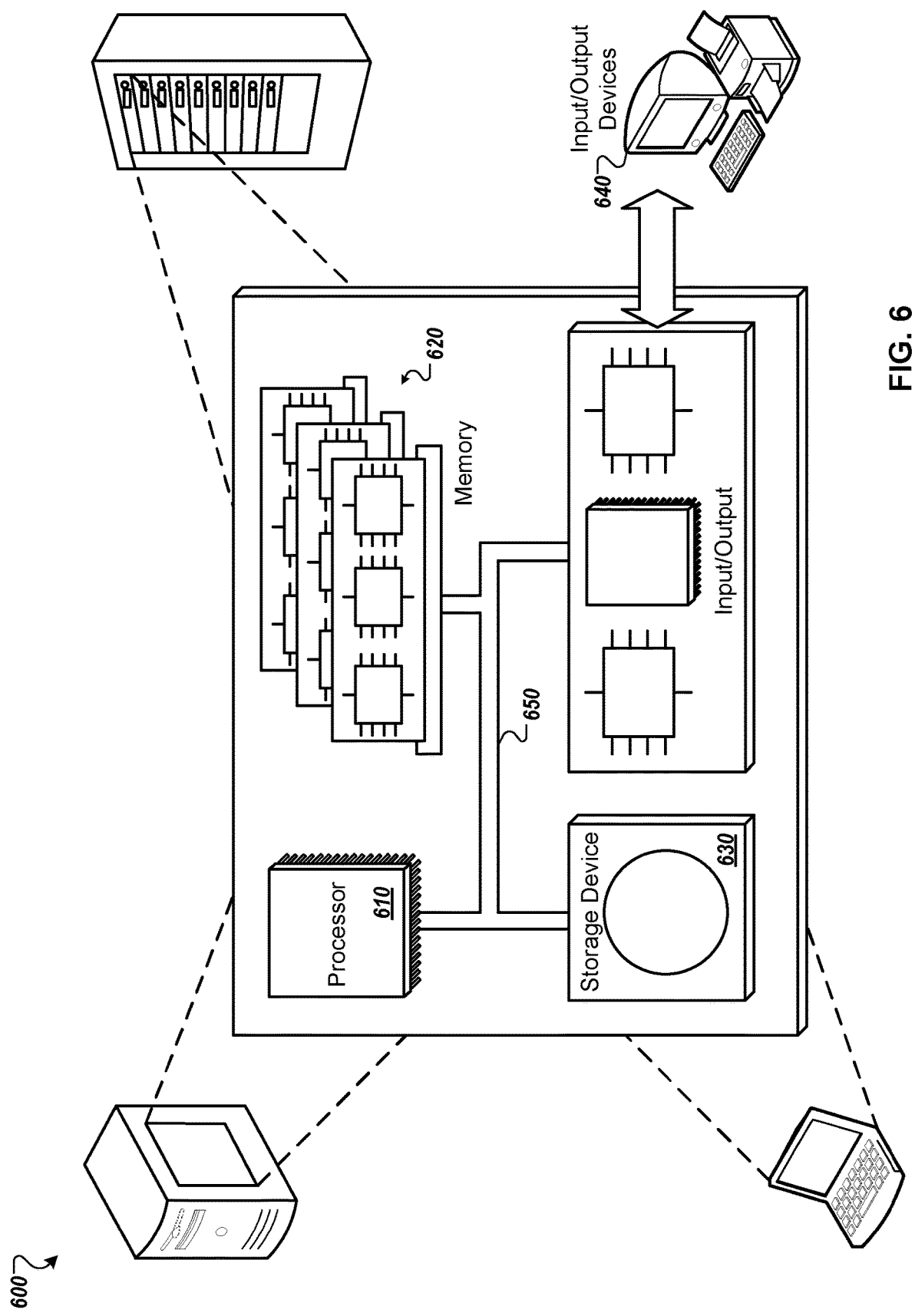

INGESTING AND TRANSFORMING BULK DATA FROM VARIOUS DATA SOURCES

CROSS-REFERENCE TO RELATED APPLICATIONS

This application claims the benefit of U.S. Provisional Application Ser. No. 62/703,280, filed Jul. 25, 2018. The disclosure of the prior application is considered part of (and is incorporated by reference in) the disclosure of this application.

BACKGROUND

This specification generally relates to data ingestion, transformation, retrieval, and forecasting.

Organizations may collect and store vast amounts of data from disparate data sources, including data sources associated with web traffic, social media updates, business transactions, industrial sensors, and so forth. The data may be maintained in a variety of structured and unstructured formats, including relational databases, non-relational databases, unstructured text documents, and message repositories, to list a few examples. In general, accessing data from different data sources maintained in different formats involves different access techniques. Automating data retrieval from a particular data source may be accomplished by writing custom application code that is directed to retrieving a particular set of data from the particular data source.

SUMMARY

This document generally describes computer systems, processes, program products, and devices for ingesting and transforming data from various data sources, which can permit different data types to be combined and used together for various tasks, such as data analysis. In one example of such a task, ingested and transformed data from multiple different data sources can be used to generate and evaluate data predictions.

For example, organizations can continuously generate and collect vast amounts of data. However, processing and analyzing this data, which can be spread across different systems, vendors, and/or services, can have different formatting (e.g., different data types, different data encoding), can be provided over different time intervals (e.g., different time series/scales, different publication intervals), and/or other differing factors such that retrieving and analyzing combinations of the data in real-time (or near real-time) can pose a significant technical challenge. Also, the structure of an organization's data can change over time, for example, as existing data sources are modified and new data sources are added, which can present additional technical challenges to continuing to use data sources on an ongoing basis. Other technical hurdles to using large and disparate data sources can include, for example, challenges around creating new data flows for ingesting and transforming data from new and/or modified data sources. The technology disclosed in this document can provide technical solutions to these challenges (as well as to alternative and/or additional challenges) through a framework for ingesting and transforming data from various data sources in a more efficient, consistent, and reliable manner that can permit data to be made readily available for further processing, such as for providing input to machine learning processes that generate data predictions, and for continually adjusting the predictions to improve prediction accuracy.

In some implementations, a method performed by data processing apparatuses includes receiving configuration data for a preconfigured data connector. The configuration data can include (i) one or more connection parameters, (ii) one or more time interval parameters, and (iii) one or more data transformation parameters. The one or more connection parameters are used to establish a connection to a bulk data source. In response to determining that an amount of time has elapsed that corresponds to the one or more time interval parameters, bulk data is retrieved from the bulk data source for a given time interval, and the retrieved bulk data is transformed in accordance with the one or more data transformation parameters. Based on transforming the retrieved bulk data, a data metric is generated that condenses the retrieved bulk data, the data metric having a measured metric value. A predetermined predicted metric value is received from a prediction data source for the data metric for a time interval that corresponds to the given time interval, and the predicted metric value is stored with the measured metric value.

Other implementations of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations can include any, all, or none of the following features. The data transformation parameters can include one or more configurable queries. The one or more data transformation parameters can include one or more of a pre-transformation parameter, an aggregation parameter, a translation parameter, and a data split parameter. Transforming the retrieved bulk data can include sequentially performing: (i) a data pre-transformation based on the pre-transformation parameter, (ii) a data aggregation based on the aggregation parameter, (iii) a data translation based on the transformation parameter, and (iv) a data split based on the data split parameter. The data pre-transformation can include performing an initial operation on the retrieved bulk data. The data aggregation can include performing one or more of a count of the retrieved bulk data, a sum of the retrieved bulk data, or an average of the retrieved bulk data. The data translation can include accessing a data map that maps a field value of the retrieved bulk data to a metric name, and substituting the field value with the metric name. The data can be post-transformed with different ways to form a metricname, metrictime and metricvalue. A difference value can be determined based on the predicted metric value and the measured metric value. A determination of whether the difference value meets or exceeds a predetermined threshold value can be performed, and in response, the measured metric value can be flagged as being an anomaly. The difference value can be stored with the predicted metric value and the measured metric value. An information graphic can be generated that plots a series of predicted metric values and corresponding measured metric values along a time axis. An average difference value over a series of difference values can be determined, and one or more future predicted metric values from the prediction data source can be adjusted based on the determined average difference value. The measured metric value can be included in training data for generating a data model that is used to generate further predicted metric values for the data metric for a plurality of future time intervals.

The systems, devices, program products, and processes described throughout this document can, in some instances, provide one or more of the following advantages. A fault-tolerant and scalable architecture is provided for transforming and condensing bulk data provided by multiple different data sources. A large volume of bulk data can be condensed into values requiring fewer bits (e.g., condense bulk data to a single measured data metric value) that represents the bulk data (or a small set of measured data metric values, such as five measured data metric values or fewer), such that data storage space is conserved. Retrieved and time-filtered bulk data can be quickly processed in memory, such that thousands or millions of records are processed at regular intervals. By providing condensed data to further processes (e.g., data prediction processes, data visualization processes, and other types of processes), the further processes may be performed more quickly, efficiently, and easily, conserving processing resources. By implementing data connectors such that the data connectors can operate using various configurable parameters, new data flows (e.g., a series of data operations for transforming data) can be quickly, efficiently, and easily created, without code changes to the data connectors. Improved efficiency in processing large amounts of data to identify and generate metrics can be achieved, which can be essential in a variety of different data processing environments that rely on the underlying data to detect and identify data in real time (or near real time). The amount of data can be reduced down to a smaller amount through the generation of metrics, which can more readily be analyzed and processed in real time or near real time. The generated metrics can be flexibly designed and readily changed/modified as needed, providing an more adaptable platform that can be used across a variety of different data feeds and for a variety of different purposes.

Other features, aspects and potential advantages will be apparent from the accompanying description and figures.

DESCRIPTION OF DRAWINGS

FIG. 6 is a schematic diagram that shows an example of a computing system.

Like reference symbols in the various drawings indicate like elements

DETAILED DESCRIPTION

This document describes technology that facilitates a process for periodically ingesting vast amounts of data from various sources, and converting the data into various measured data metrics, each measured data metric including a single data value for the data metric that represents all of the data that has been collected for that data metric over a particular time period (e.g., a most recent one minute, five minutes, ten minutes, or another suitable time period). Machine learning techniques can be used to generate a data model for each data metric. The data models can be used in a variety of ways, such as to predict future values for the data metrics. Such example predicted metric values can be used to guide resource allocation within a computer network (e.g., based on a predicted condition such as a predicted increase in network traffic). For example, the predicted metric values can also be compared to measured metric values at future time intervals to identify possible data anomalies. Other example data metrics and uses for data metrics are also possible.

Figure 1:
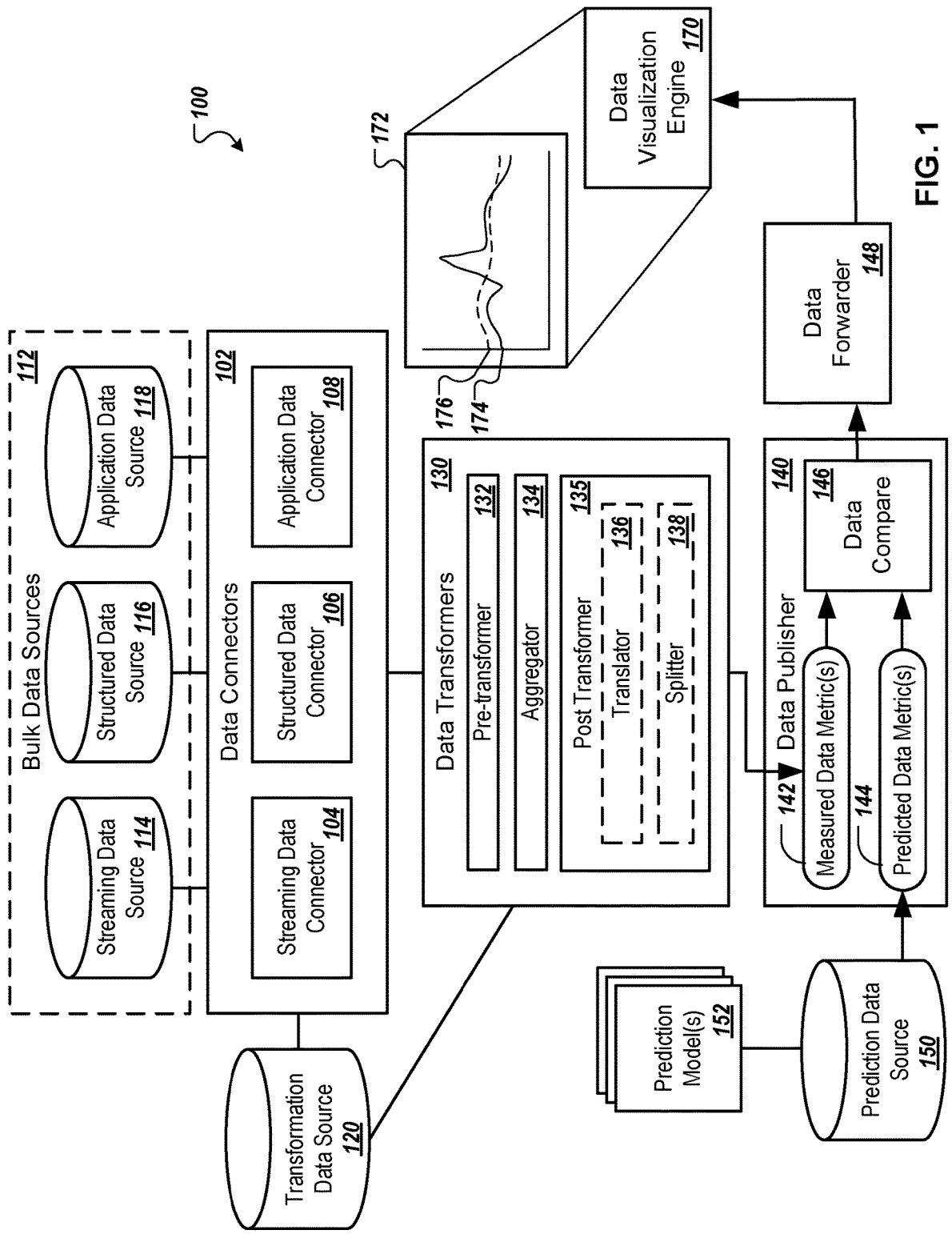
FIGS. 1 and 2 are conceptual diagrams of example systems used for retrieving and transforming data from various data sources, and for generating and evaluating data predictions based on the transformed data.

FIG. 1 is a conceptual diagram of an example system 100 for retrieving and transforming data from various data sources, and for generating and evaluating data predictions based on the transformed data. In the depicted example, various data connectors 102 (e.g., including a streaming data connector 104, a structured data connector 106, and an application data connector 108) can each be configured to connect to a corresponding bulk data source 112. For example, the streaming data connector 104 can be configured to connect to a streaming data source 114, the structured data connector 106 can be configured to connect to a structured data source 116, and the application data connector 108 can be configured to connect to an application data source 118. Other data connectors and other bulk data sources are also possible. In general, each of the data connectors 102 can be configured to establish a data connection with a corresponding one of the bulk data sources 112 (e.g., including new or modified data sources), without code changes to the data connector framework itself. Rather, each of the data connectors 102 can receive configuration details (e.g., data source connection parameters provided through a user interface (not shown)) from a transformation data source 120 and can execute existing application code to establish a data connection with a corresponding one of the bulk data sources 112 (e.g., a bulk data source that corresponds to the data connector) using the received configuration details. Each of the data connectors 102, for example, can be implemented as one or more software components (e.g., software modules, objects, engines, libraries, services), which may be implemented on a same computing device, on different devices, such as devices included in a computer network, or on a special purpose computer or special purpose processor.

The bulk data sources 112 can include data sources accessible to an enterprise data network (not shown). The streaming data source 114, for example, can include data this is continuously generated, such as data generated in response to user interaction with web pages or mobile applications, data generated from online stores and/or online sales, data generated from in-store activity and sales, data generated in response to sensor activity in transportation vehicles or industrial equipment, data generated in response to monitored network activity, data generated in response to financial transactions, or other sorts of continuously generated data. In general, access to the streaming data source 114 can be provided by a data stream management system (DSMS) which manages access to continuous data streams from tools like Kafka, MQ, etc. The structured data source 116, for example, can include structured data, which can be stored in a collection of tables (e.g., in a relational database)

or other database formats/configurations. In general, access to the structured data source 116 can be provided by a database management system (DBMS) which administers and manages access to databases. The application data source 118, for example, can include application data that may be provided via one or more services that are different from a DSMS or a DBMS. For example, access to the application data source 118 can be provided through an application programming interface (API) and corresponding application system (e.g., application server system backend), which can include protocols for retrieving various data structures from the application data source 118.

After connecting to one or more of the bulk data sources 112, the example system 100 can use one or more data transformers 130 to retrieve and transform data from the data source(s). Each of the data transformers 130, for example, can be implemented as one or more software components (e.g., software modules, objects, engines, libraries, services), which may be implemented on a same computing device, on different devices, such as devices included in a computer network, or on a special purpose computer or special purpose processor. In the present example, the data transformers 130 include a data pre-transformer 132, a data aggregator 134, a data post-transformer 135, which can include options like a translator 136, a data splitter 138, and/or other additional features. In general, each of the data transformers 130 can be configured to retrieve and transform data from new or modified data sources as provided through the data connectors 102. Like the data connectors 102, which can be adapted to be used with new data sources through configuration data that does not require the data connectors 102 themselves to be recoded, the data transformers 130 can similarly be adapted to retrieve and transform data from new or modified data sources through configuration data and without code requiring changes to the data transformer 130 itself. For example, each of the data transformers 130 can receive data transformation details (e.g., data transformation parameters provided through a user interface (not shown)) from the transformation data source 120 and can execute existing application code to retrieve and transform data from the bulk data sources 112. Parameters that are used by the data transformer 130 to generate metrics can be specific to each metric and can include, for example, queries that are to be iteratively run by the pre-transformer 132 on the bulk data sources 112 (via the data connectors 102), values retrieved by the queries that are to be aggregated and/or otherwise combined by the aggregator 134, mappings and/or other conversions that are used by the translator 136 to generate the specific metrics (and their associated metric values) from the combined data values generated by the aggregator 134, and to perform post-transformations by the post transformer 135, which can include, for example, data splitting for multiple dimensions of a single metric. Additionally, in this phase required features can be added with respect to time, such as hour, minute, day, week, etc. As a result of the data transformers 130 retrieving and transforming data from one or more of the bulk data sources 112 via the data connectors 102, the example system 100 can generate one or more measured data metrics 142 that condense data from the bulk data source(s) 112 (e.g., a vast number of records and/or log file entries) into measured data metric(s) 142 including a single key/value pair (or a small set of key/value pairs) that represents the retrieved and transformed data.

The data transformers 130 can retrieve and transform data from one or more of the bulk data sources 112 at regular periodic intervals (e.g., once per minute, once every five minutes, once every ten minutes, or another suitable interval), such that measured data metric(s) 142 are generated for each of the intervals. For example, the pre-transformer 132 can iteratively query the data connectors 102 for new data that has been received since the previous query from the pre-transformer 132. For each iteration, the pre-transformer 132 can provide the data retrieved as a result of the queries to the aggregator 134, which can combine the data in various ways specific to each metric and provide the combined data to the translator 136. As discussed above, the translator 136 can translate the combined data into one or more data metric values that are associated with particular metric names. The translator 136 can provide the metric values to the post-transformer 135 to transform it to, for example, a metric-name, metrictime, metricvalue with its time features for each metric.

After retrieving and transforming data from the bulk data sources 112, the example system 100 can use a data publisher 140 to provide the system 100 with access to the transformed data (and possibly additional data that is relevant to the transformed data), for further processing and/or for presentation by data visualization components. The data publisher 140, for example, can be implemented as one or more message queue to which data is published. Each of the one or more message queue, for example, can then stream the published data to various subscribing data consumers (e.g., client computing devices and processes). For example, the system 100 can use a data comparator 146 (e.g., a utility used to monitor and access one or more message queue of the data publisher 140, and to handle data communications with further processes) to access the measured data metric(s) 142 from the data publisher 140, and to retrieve predicted data metric(s) 144 from a prediction data source 150, the predicted data metric(s) 144 including a single key/value pair (or a small set of key/value pairs) that was previously generated as a prediction for the current time (at which the measured data metric(s) 142 are generated), and that corresponds to the measured data metric(s) 142. The measured data metric(s) 142 can be provided to the prediction data source 150 (e.g., a database management system) for storage and for generating predicted data values for one or more future times (e.g., predicted data values for next hour, day, week, month, year). The predicted data values can be generated from one or more prediction models 152 that can correlate a variety of inputs, including the measured data metrics 142, to determine the predicted values for one or more future times.

The measured data metrics 142 and the predicted data metrics 144 (prediction for the current time that was previously generated) can additionally be used to further refine and improve upon the one or more prediction models 152. For example, the measured data metrics 142 can be compared against the predicted data metrics 144 to evaluate how accurate the prediction actually was. Discrepancies between the predicted and measured data metrics can cause the prediction model 152 to be further refined and adjusted, such as through one or more machine learning techniques. For example, to generate the prediction model(s) 152, for example, the system 100 can periodically (e.g., hourly, daily, weekly, or at another suitable time interval) provide data from the prediction data source 150 to one or more machine learning algorithms (e.g., a machine learning algorithm that uses gradient boosting, or another suitable machine learning technique). In general, training data sets used to generate the prediction model(s) 152 may include measured data metric(s) 142 that are based on data collected over an extended time period (e.g., several days, weeks, months, years, or another suitable time period). The generated prediction model(s) 152 can then be used to generate a series of predicted data metric(s) 144, each predicted data metric being a key/value pair that includes a predicted value for one of the measured data metric(s) 142 for a particular future time interval. The predicted data metric(s) 144 can be generated for a time range that extends over a day, over two days, over seven days, or another suitable time range. After the predicted data metric(s) 144 are generated using the prediction model(s) 152, for example, the predicted data metric(s) 144 can be stored in the prediction data source 150 and can be provided to further processes.

One or more predicted data metrics 144 can be compared to one or more measured data metrics 142 by a data comparator 146 to identify potential data anomalies, and/or to generate one or more visualizations based on the compared data. For example, the data comparator 146 can retrieve the predicted data metric(s) 144 that correspond to the measured data metric(s) 142 and perform a comparison of the predicted data metric(s) 144 and the measured data metric(s) 142 for a given time interval (e.g., a most recent time interval). The data comparator 146 can provide the compared data, as well as in some instances both metrics (or sets of metrics), to the data forwarder 148, which can connect directly to the data comparator 146 through the data publisher 140 to obtain these data values. The data forwarder 148, for example, can receive and forward a series of comparison data for pairs of measured data metrics 142 and corresponding predicted data metrics 144, each pair being for a discrete time interval (e.g., one minute, five minutes, ten minutes, or another suitable time interval). Data can be provided by the data forwarder 148 to a data visualization engine 170 (e.g., a data analytics platform that analyzes and/or generates visualizations based on received data). The data visualization engine 170, for example, can generate an information graphic 172 (e.g., a graphic interface which can be presented on a display of a computing device). In the present example, an example information graphic 172 is depicted that plots each of a series of measured data metrics 142 (e.g., represented by data value indicator 174) and each of a series of corresponding predicted data metrics 144 (e.g., represented by data value indicator 176) over time, such that data trends and data anomalies may be easily identified.

Figure 2:
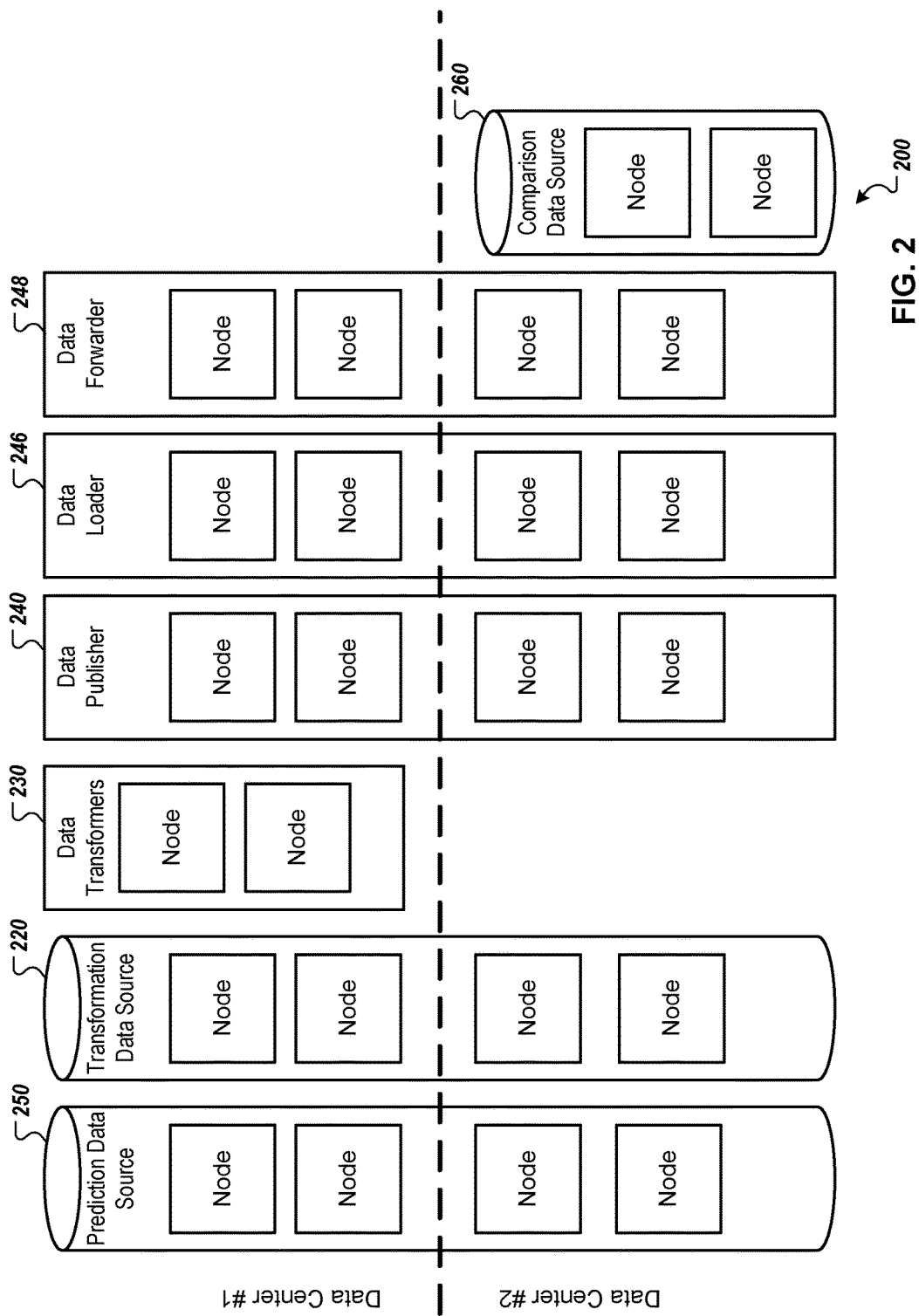

FIG. 2 is a conceptual diagram of an example system 200 for retrieving and transforming data from various data sources, and for generating and evaluating data predictions based on the transformed data. In the depicted example, various components of the example system 100 (shown in FIG. 1) are shown as being distributed across multiple data centers. For example, a prediction data source 250 (e.g., similar to the prediction data source 150, shown in FIG. 1), a transformation data source 220 (e.g., similar to the transformation data source 120, shown in FIG. 1), a data publisher 240 (e.g., similar to the data publisher 140, shown in FIG. 1), a data loader 246, and a data forwarder 248 (e.g., similar to the data forwarder 148, shown in FIG. 1) can each be implemented across multiple data centers (e.g., data center #1 and data center #2), each including a set of nodes operating on a respective data center. In the present example, data transformers 230 (e.g., similar to the data transformers 130, shown in FIG. 1) can be implemented using a set of nodes included in one data center (e.g., data center #1), whereas a comparison data source 260 (e.g., similar to the comparison data published by the data comparator 146, shown in FIG. 1) can be implemented using a set of nodes included in a different data center (e.g., data center #2). By distributing components across data centers and/or nodes, for example, resource availability may be maintained in the event of a node failure and/or loss of data center access. Each of the components can be readily scaled, for example, by adding nodes to the component. For example, the components can be provided as part of a cloud computing system in which the instances of each component can be readily scaled up or down to meet demands.

Figure 3:
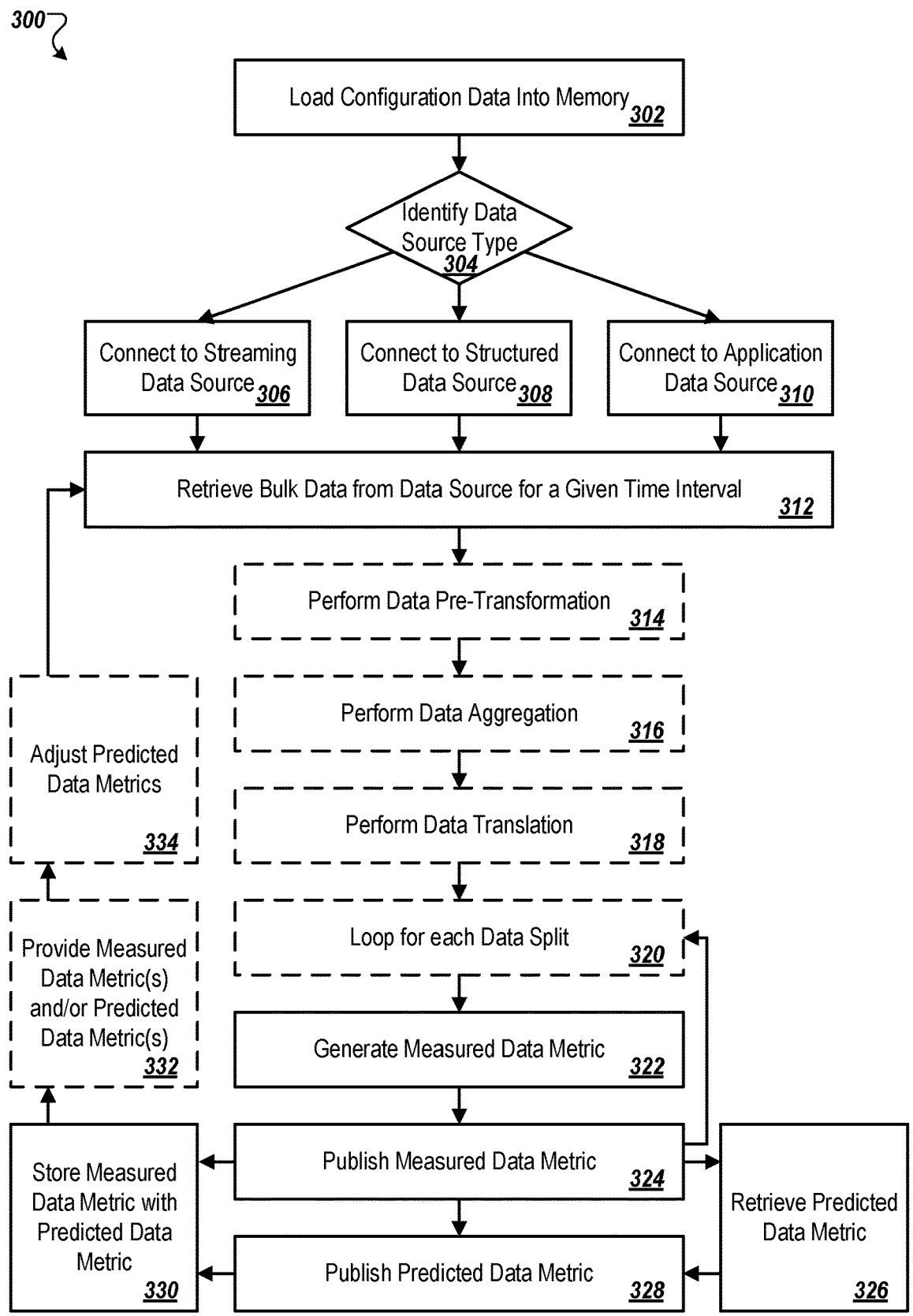
FIG. 3. shows an example process for retrieving and transforming data from various data sources, and for generating and evaluating data predictions based on the transformed data.

FIG. 3 shows an example process 300 for retrieving and transforming data from various data sources, and for generating and evaluating data predictions based on the transformed data. The process 300 can be performed by components of the system 100, for example, and will be described with reference to FIG. 1. However, other systems may be used to perform the same or a similar process.

At box 302, configuration data for configuring a data flow (e.g., a series of data operations for transforming data) for generating a measured data metric is loaded into memory. Referring to FIG. 1, for example, configuration data for one or more of the data connectors 102 can be loaded into memory from the transformation data source 120. The configuration data can include various configurable parameters, including one or more connection parameters, one or more time interval parameters, and one or more data transformation parameters. For example, the connection parameters can be used to access a data source that is a source of bulk data on which the measured data metric is based, the time interval parameters can specify how often data is to be retrieved from the data source, and the data transformation parameters can specify a series of data operations used to condense a large volume of bulk data (e.g., many thousands, millions, or billions of records) into a single measured data metric (or a small set of measured data metrics) that represents the large volume of bulk data. By condensing bulk data from the bulk data sources 112, for example, data storage space in the system 100 can be conserved, and one or more further processes (e.g., data prediction processes, data visualization processes) may be performed more quickly and easily, conserving processing resources. By implementing the data connectors 102 such that the data connectors 102 can operate using various configurable parameters, for example, new data flows can be quickly and easily created, without code changes to the data connectors 102.

At box 304, a data source type is identified. For example, the connection parameters can specify a type of data source that includes bulk data on which a particular measured data metric is to be based. The type of data source can be associated with a particular data connector that is configured to establish a connection with data sources of that type.

At box 306, if the identified data source type indicates that the data source is a streaming data source, the streaming data connector 104 (shown in FIG. 1) is used to establish a connection to the streaming data source 114 (shown in FIG. 1) using the one or more connection parameters. For example, the connection parameters for establishing the connection to the streaming data source 114 can include a broker list parameter, a lag parameter, a checkpoint parameter, a partitions parameter, a group ID parameter, a topic set parameter, a parser type parameter, a timeout parameter, a schema name parameter, a schema URL parameter, and other suitable connection parameters for the streaming data source 114.

At box 308, if the identified data source type indicates that the data source is a structured data source, the structured data connector 106 (shown in FIG. 1) is used to establish a connection to the structured data source 116 (shown in FIG. 1) using the one or more connection parameters. For example, the connection parameters for establishing the connection to the structured data source 116 can include a user ID parameter, a password parameter, a connection description parameter, a service name parameter, a database name parameter, a database type parameter, a query parameter, an interval parameter, a last update parameter, a loop limit parameter, and other suitable connection parameters for the structured data source 116.

At box 310, if the identified data source type indicates that the data source is an application data source, the application data connector 108 (shown in FIG. 1) is used to establish a connection to the application data source 118 (shown in FIG. 1) using the one or more connection parameters. For example, the connection parameters for establishing the connection to the application data source 118 can include a message format parameter, an application programming interface URL parameter, an application programming interface method parameter, an application programming interface header parameter, an application programming interface body parameter, a from time parameter, a to time parameter, a time zone parameter, an increment parameter, a last update parameter, and other suitable parameters for the application data source 118.

At box 312, in response to determining that an amount of time has elapsed that corresponds to one or more time interval parameters, data retrieval from a bulk data source is initiated for a given time interval. The time interval parameters, for example, can include a window duration parameter that specifies a duration of a window over which time series data is to be retrieved, and a slide duration parameter that specifies an interval at which data retrieval is to be performed. For example, a data flow can be associated with time interval parameters that specify that time series data that has been generated over a most-recent number of minutes (e.g., one minute, five minutes, ten minutes, or another suitable length of time) is to be retrieved and transformed.

At boxes 314, 316, 318, and 320, bulk data is retrieved and transformed in accordance with one or more optional data transformation parameters. Referring to FIG. 1, for example, the system 100 can use the data transformers 130 to transform bulk data from the bulk data sources 112. In some implementations, the one or more data transformation parameters can include one or more of a pre-transformation parameter, an aggregation parameter, a translation parameter, and a data split parameter. The data transformation parameters can be configurable, for example, such that data transformation operations for a data flow can be specified without code changes to the data transformers 130. In some implementations, the data transformation parameters can include one or more configurable queries. For example, each of the pre-transformation, aggregation, translation, and data split parameters can include one or more configurable queries applied in sequence, to condense bulk data received from any of the bulk data sources 112 into a single measured data metric (or a small set of measured data metrics).

Figure 4:
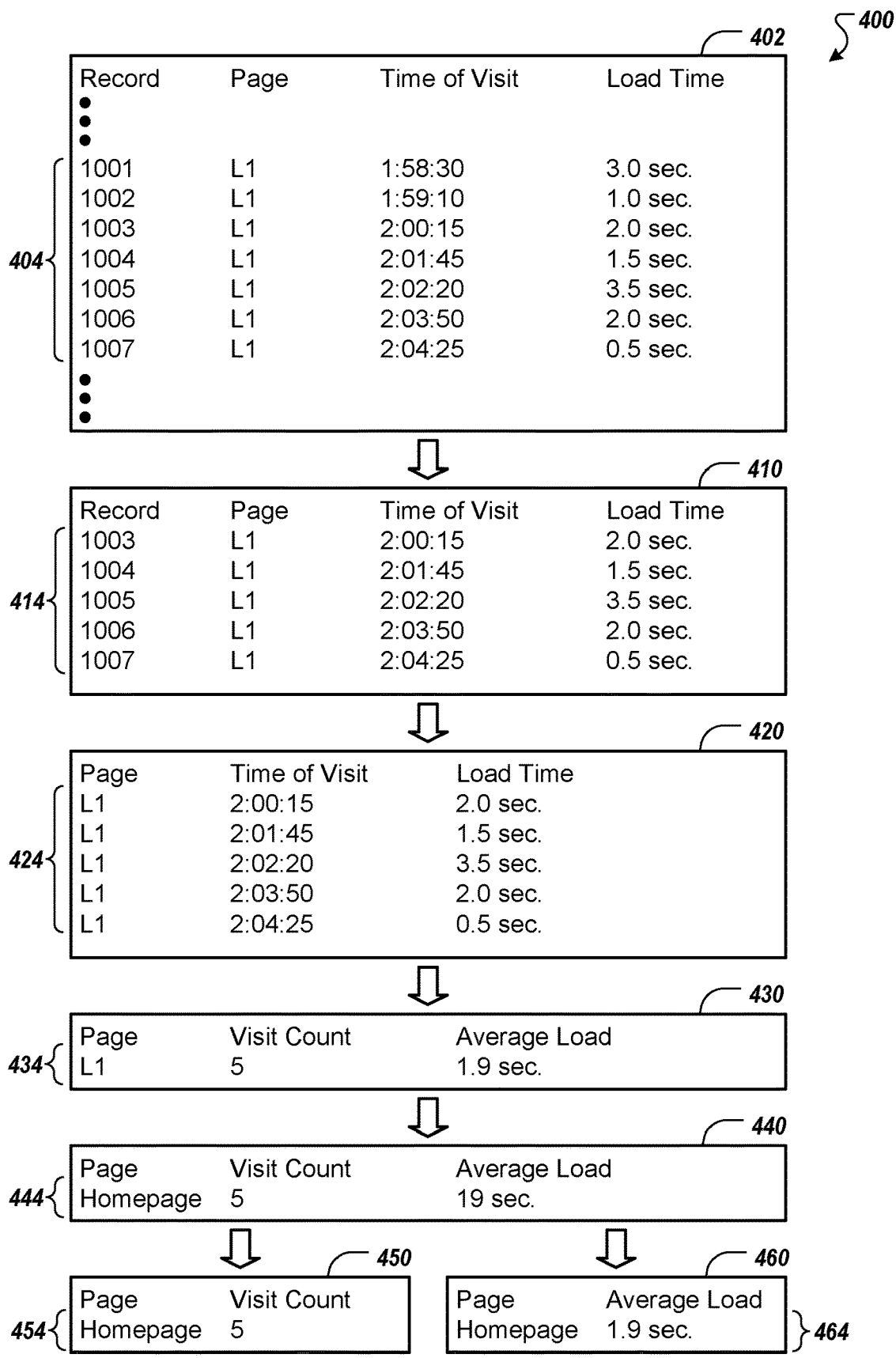
FIG. 4. shows an example data transformation.

At box 314, a data pre-transformation is optionally performed based on a pre-transformation parameter. For example, the system 100 can use the pre-transformer 132 (shown in FIG. 1) to perform the data pre-transformation. Referring now to FIG. 4, an example data transformation 400 is shown. For example, bulk data 402 can include a set of time series data in which data records 404 are continually added by one of the bulk data sources 112 in response to computer-detected events (e.g., user visits to a particular web page or another sort of event). In the present example, each of the data records 404 includes values for each of a set of data fields (e.g., record identifier, web page, time of visit, and time to load page). The bulk data 402 can include many thousands, millions, or billions of records, for example.

In some implementations, performing the data pre-transformation can include retrieving bulk data from a bulk data source. For example, based on the pre-transformation parameter and the time interval parameters, the pre-transformer 132 can retrieve a time-filtered data subset 410 of the bulk data 402 (e.g., including data that has been generated over a most-recent number of minutes). In the present example, the time-filtered data subset 410 includes only data records 414 that have been added to one of the bulk data sources 112 over the past five minutes (e.g., in response to user visits to web page "L1" over the past five minutes), thus reducing a vast number or records to a limited number of records for further processing. In general, retrieved and time-filtered bulk data can be quickly processed in memory (e.g., in a data frame), until the bulk data has been condensed to a single measured data metric (or a small set of measured data metrics), when it is then stored.

In some implementations, performing the data pre-transformation can include performing an initial operation on retrieved and time-filtered bulk data. For example, based on the pre-transformation parameter, the pre-transformer 132 can perform a data operation (e.g., an operation that further filters the time-filtered data subset 410 based on a condition other than a time condition and/or removes one or more data fields). In the present example, the pre-transformer 132 can generate a pre-transformed data subset 420 from the time-filtered data subset 410, the pre-transformed data subset 420 including data records 424. In the present example, each of the data records 424 has a limited number of data fields relative to a number of fields associated with the bulk data 402.

At box 316, a data aggregation is optionally performed based on an aggregation parameter. For example, the system 100 can use the aggregator 134 (shown in FIG. 1) to perform the data aggregation. In some implementations, performing the data aggregation can include performing one or more of a count of retrieved bulk data, a sum of retrieved bulk data, or an average of retrieved bulk data. For example, the aggregator 134 can aggregate the data records 424 to generate aggregated data 430 that includes a single aggregated data record 434. In the present example, the single aggregated data record 434 includes aggregated data that pertains to user visits of a particular web page (e.g., "L1") over a particular time period (e.g., the most recent five minutes), including a count of visits (e.g., five visits) and an average time to load the page (e.g., 1.9 seconds).

At box 318, a data translation is optionally performed based on a translation parameter. For example, the system 100 can use the translator 136 (shown in FIG. 1) to perform the data translation. In some implementations, performing the data translation can include accessing a data map that maps a field value of retrieved bulk data to a metric name, and substituting the field value with the metric name, thus providing a meaningful data label and facilitating further processes. For example, the translator 136 can perform a translation operation on the aggregated data record 434 to generate translated data 440 that includes a single translated data record 444. In the present example, the single translated data record 444 is translated such that a field value of "L1" for the "Page" field is substituted with the metric name "Homepage," which provides a more meaningful data label for the metric name.

At box 320, a data split is optionally performed based on a data split parameter. For example, the system 100 can use the splitter 138 (shown in FIG. 1) to perform the data split.

In some implementations, performing the data split can include associating a metric name with a single metric value. For example, the splitter 134 can perform a splitting operation on the translated data record 444 to generate two or more split data items (e.g., split data 450 and split data 460), each split data item including a single data record (e.g., data record 454 and data record 464). In the present example, data record 454 includes a value for a visit count to "Homepage," and data record 464 includes a value for an average time to load "Homepage."

At box 322, based on transforming the retrieved bulk data, at least one data metric that condenses the retrieved bulk data is generated, the data metric having a measured metric value. For example, after the data transformers 130 (shown in FIG. 1), have transformed a time-filtered data subset 410 of the bulk data 402 from one of the bulk data sources 112 to a small set of data records (e.g., data records 454 and 464), a measured data metric can be generated for each of the small set of data records. In the present example, the data record 454 is used for generating a first measured data metric that includes a value that indicates a visit count for "Homepage" over a particular time period (e.g., the most recent five minutes, 2:00:00 to 2:04:59), and the data record 464 is used for generating a second measured data metric that includes a value that indicates an average time to load "Homepage" over the particular time period.

At box 324, the measured data metric value is published. Referring again to FIG. 1, the data transformers 130 can provide the measured data metric 142 (e.g., the first measured data metric that includes a value that indicates a visit count for "Homepage" from 2:00:00 to 2:04:59) to the data publisher 140, which can publish the measured data metric 142 for immediate access to any number of further processes that subscribe to data provided by the data publisher 140. After publishing the measured data metric, for example, the process 300 can loop back to box 320 to generate and publish possible additional measured data metrics that may result from performing a data split. In the present example, after the first measured data metric is published (e.g., a measured data metric that includes a value that indicates a visit count for "Homepage" from 2:00:00 to 2:04:59), the second data metric (e.g., a measured data metric that includes a value that indicates an average time to load "Homepage" from 2:00:00 to 2:04:59) can be generated and published.

At box 326, a predicted data metric is retrieved, the predicted data metric having a predicted metric value. Retrieving the predicted data metric can include receiving, from a prediction data source, a predetermined predicted metric value for the data metric for a time interval that corresponds to a given time interval. For example, the data loader 246 can receive the measured data metric 142 and can determine that the measured data metric 142 is associated with a particular name (e.g., a key value such as "HomepageVisitCount") and a particular time range (e.g., 2:00 to 2:04:59), and can be provided to the data comparator 146 for processing. The data comparator 146 can then retrieve the predetermined predicted metric 144 for the measured data metric 142 for the particular time range, from the prediction data source 150. For example, the prediction data source 150 can include predetermined predicted values for a particular data metric for each of a sequence of time intervals (e.g., one minute intervals, five minute intervals, ten minute intervals, or another suitable time interval) that occur over the course of a predicted time range (e.g., a day, two days, or another suitable time range). Predetermined predicted metrics for various data metrics can be stored in a predictions data structure (e.g., a table or another suitable data structure). For example, the prediction data source 150 can include a predictions data structure that stores a metric name, a metric source, a metric time (e.g., time interval), a predicted value, an adjusted predicted value, and a value insertion date for various data metrics.

In some implementations, a difference value is determined, the difference value being based on the predicted metric value and the measured metric value. For example, the data comparator 146 can determine a difference between a measured data value for the measured data metric 142 and a predicted data value for the predicted data metric 144. If the difference value meets or exceeds a predetermined threshold value, for example, the measured metric value can be flagged as being an anomaly. For example, if the difference value meets or exceeds a value that is a predetermined percentage of the predicted data value (e.g., twenty percent, fifty percent, one hundred percent, or another suitable value), the measured metric value can be flagged. A predetermined threshold value for flagging a measured metric value as an anomaly can be configurable for any given data metric, for example. As another example, anomaly detection can be performed using a machine learning model that analyzes a series of measured metric values and corresponding predicted metric values.

At box 328, the predicted data metric is published. For example, the data comparator 146 can publish the predicted data metric 144 (e.g., a predicted data metric that includes a value that indicates a predicted visit count for "Homepage" from 2:00:00 to 2:04:59), which can make the predicted data metric 144 available for immediate access to any number of further processes that subscribe to data provided by the data publisher 140, such as the data forwarder 148 and the data visualization engine 170. In some implementations, a difference valued based on a predicted metric value and a measured metric value can be published. For example, the data comparator 146 can publish the predicted data metric 144 along with a difference value that indicates a difference between a value of the predicted data metric 144 and a value of the measured data metric 142, and/or an indication that a possible data anomaly has been flagged.

At box 330, the measured data metric value is stored with the predicted data metric value. For example, the data comparator 146 can retrieve and compare the received value for the measured data metric 142 for storage with its corresponding value for the predicted data metric 144, as provided by the prediction data source 150. In some implementations, the data comparator 146 can determine a difference value between the predicted metric value and the measured metric value. The data forwarder 148 can receive such comparison data (e.g., difference value and, optionally, a flagged anomaly) and, in some instances, the measured data metric 142 and the predicted data metric 144 for a corresponding time interval, and can provide those values to the data visualization engine 170. In some implementations, measured data metric values and predicted data metric values can be stored together in a measured data structure (e.g., a table or another suitable data structure). For example, the prediction data source 150 and/or the comparison data published by the data comparator 146 can include a measured data structure that stores a metric name, a metric time, a metric value, a predicted value, an adjusted predicted value, a difference value, an incident value (e.g., for flagged data anomalies), one or more time features (e.g., year, month, week, date, day of week, hour, minute, and other suitable time features), and one or more holiday features (e.g., black Friday, cyber Monday, Thanksgiving, holiday weekend, limited time offer, and other suitable holiday features), for various data metrics.

At box 332, the measured data metric value and/or the predicted metric value can be provided to further processes. For example, data metric values and associated data can be provided to further processes by each of the prediction data source 150 and the data comparator 146.

In some implementations, the measured metric value can be included in training data for generating a data model that is used to generate further predicted metric values for the data metric for a plurality of future time intervals. For example, the prediction data source 150 can provide training data including a series of measured data metric values for a particular data metric (e.g., a count of page visits, an average page load time, or another metric) that have been regularly generated over the course of an extended time period (e.g., days, weeks, months, or years), along with associated time features and/or holiday features, to one or more machine learning algorithms. Based on the training data, the machine learning algorithms can generate the prediction model(s) 152, which are then used to periodically (e.g., daily) generate predicted data metric values for the particular data metric, each predicted data metric value being for a discrete time interval that will occur over the course of the next day or several days. The predicted data metric values can be stored by the prediction data source 150 in the predictions data structure, for example.

In some implementations, an information graphic can be generated that plots a series of predicted metric values and corresponding measured metric values along a time axis. For example, the data visualization engine 170 can access the comparison data published by the data comparator 146 and the data publisher 140, and can retrieve, for a particular data metric and time interval, a measured data metric value, a corresponding predicted data metric value, and optionally, a calculated difference value. The data visualization engine 170 can generate and continuously update the information graphic 172, for example, based on data metric values that are continually added to the comparison data published by the data comparator 146 and the data publisher 140.

Figure 5:
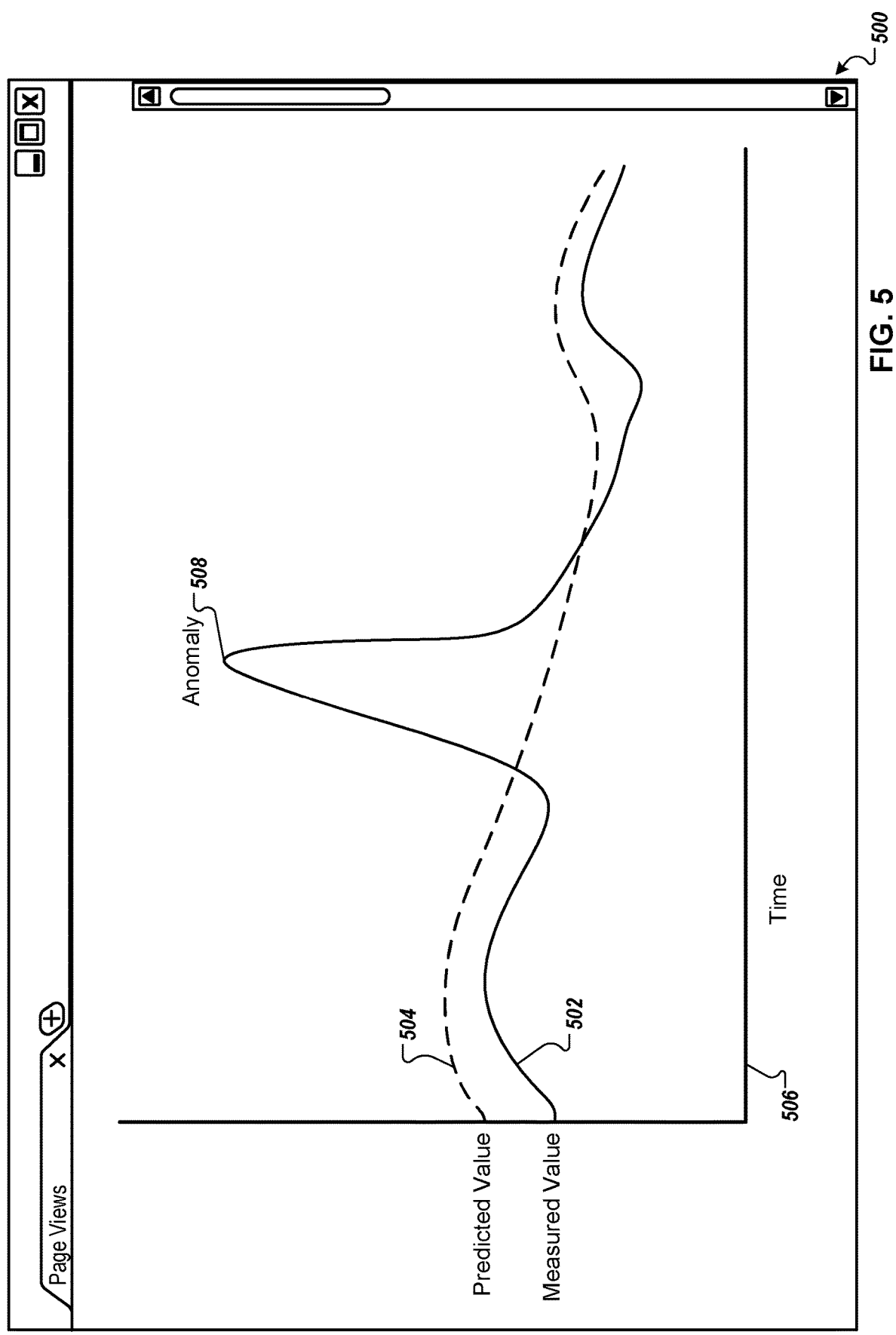
FIG. 5. shows an example user interface that facilitates a comparison between measured and predicted data metric values.

Referring now to FIG. 5, an example, user interface 500 that facilitates a comparison between measured and predicted data metric values is shown. In the present example, for a particular data metric (e.g., a count of page visits, an average page load time, or another metric), a first indicator 502 for measured values, and a second indicator 504 for corresponding predicted values 504 are each plotted against a time axis 506, for each of a series of regular time intervals (e.g., once per minute, once per every five minutes, once per every ten minutes, or another suitable time interval). The user interface 500, for example, can be dynamically updated at each time interval, such that a user can readily identify data trends and anomalies for a particular data metric. In the present example, data anomaly 508 occurs when, for a particular time interval, a measured value for the data metric is shown to be significantly different (e.g., at least 50% or another percentage greater or less than) a corresponding predicted value for the time interval. In some implementations, additional indicators (e.g., indicators for adjusted predicted values, difference calculations, and other suitable data indicators) can be represented on the user interface 500. Each indicator, for example, can be represented by a different color, dash pattern, and/or line weight.

At box 334, predicted data metric values can be adjusted. Adjusting predicted data metric values can include determining an average difference value over a series of determined difference values, and adjusting one or more future predicted metric values from a prediction data source, based on the determined average difference value. For example, at one or more scheduled times during a day (e.g., at 7:00 AM, 9:00 AM, 5:00 PM, and/or other suitable scheduled times) the data comparator 146 can access the prediction data source 150 (shown in FIG. 1) and can adjust future predicted metric values that were generated at a prior time (e.g., at midnight). To adjust future predicted metric values, for example, recent measured metric values can be analyzed for a specified time window (e.g., measured metric values that had been generated over the last hour, two hours, or another suitable time window). For example, measured metric values for a particular data metric may be found to have deviated from predicted metric values, on average, by an identified particular percentage value (e.g., measured metric values have been 10% greater than predicted metric values on average). In the present example, the identified percentage value (e.g., 10%) can be applied to future predicted metric values to generate, for each future time interval represented in the predicted data source 150, an adjusted predicted metric value that accounts for activity that was not originally predicted by the prediction model(s) 152 (shown in FIG. 1). In some implementations, adjusted predicted metric values can be used in place of predicted metric values when detecting data anomalies. By using adjusted predicted metric values in place of predicted metric values, for example, anomalies can be more accurately flagged given conditions that had not been considered when generating the prediction model(s) 152.

FIG. 6 is a schematic diagram that shows an example of a computing system 600. The computing system 600 can be used for some or all of the operations described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machinereadable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A computer-implemented method comprising:
receiving configuration data for a preconfigured data connector, wherein the configuration data includes connection parameters for establishing a connection to a bulk data source, a time interval parameter that specifies how often bulk data is to be retrieved from the bulk data source, a time window parameter that specifies a duration of a time window over which the bulk data is to be retrieved from the bulk data source, and data transformation parameters that specify a series of data operations for condensing the bulk data into a data metric;
using the preconfigured data connector and the connection parameters to establish the connection to the bulk data source; and
for each time interval of a series of time intervals that correspond to the time interval parameter
in response to determining that an amount of time has elapsed that corresponds to the time interval parameter, retrieving the bulk data from the bulk data source for a most-recent time window, in accordance with the time window parameter;
transforming the retrieved bulk data for the most-recent time window, in accordance with the data transformation parameters, wherein transforming the retrieved bulk data includes sequentially performing a data pre-transformation, a data aggregation, a data translation, and a data split;
based on transforming the retrieved bulk data, generating, for a data metric, a measured metric value that condenses the retrieved bulk data for the most-recent time window;
receiving, from a prediction data source, a predicted metric value for the data metric for the most-recent time window;
storing the predicted metric value for the data metric along with a series of previously predicted metric values, and storing the measured metric value for the data metric along with a series of previously measured metric values for the data metric; and
generating, for presentation on a display of a computing device, an information graphic that plots the series of previously predicted metric values relative to the series of previously measured metric values over time.

2. The method of claim 1, wherein the data transformation parameters include one or more configurable queries.

3. The method of claim 1, wherein the data transformation parameters include a pre-transformation parameter, an aggregation parameter, a translation parameter, and a data split parameter.

4. The method of claim 3, wherein transforming the retrieved bulk data for the most-recent time window includes sequentially performing the data pre-transformation based on the pre-transformation parameter, the data aggregation based on the aggregation parameter, the data translation based on the translation parameter, and the data split based on the data split parameter.

5. The method of claim 4, wherein the data pre-transformation includes performing an initial operation on the retrieved bulk data.

6. The method of claim 4, wherein the data aggregation includes performing one or more of a count of the retrieved bulk data, a sum of the retrieved bulk data, or an average of the retrieved bulk data.

7. The method of claim 4, wherein the data translation includes accessing a data map that maps a field value of the retrieved bulk data to a metric name, and substituting the field value with the metric name.

8. The method of claim 4, wherein the data is post-transformed with different ways to form a metric name, a metric time, and a metric value.

9. The method of claim 1, further comprising determining a difference value based on the predicted metric value and the measured metric value.

10. The method of claim 9, further comprising determining that the difference value meets or exceeds a predetermined threshold value, and in response, flagging the measured metric value as being an anomaly.

11. The method of claim 9, further comprising storing the difference value with the predicted metric value and the measured metric value.

12. The method of claim 11, wherein the information graphic plots the series of previously predicted metric values and the series of previously measured metric values, along a value axis and along a time axis.

13. The method of claim 11, further comprising:
determining an average difference value over a series of determined difference values; and
adjusting one or more future predicted metric values from the prediction data source based on the determined average difference value.

14. The method of claim 1, further comprising including the measured metric value in training data for generating a data model that is used to generate further predicted metric values for the data metric for a plurality of future time windows.

15. A computer system comprising:
a data processing apparatuses including one or more processors, memory, and storage devices storing instructions that, when executed, cause the one or more processors to perform operations comprising:
receiving configuration data for a preconfigured data connector, wherein the configuration data includes connection parameters for establishing a connection to a bulk data source, a time interval parameter that specifies how often bulk data is to be retrieved from the bulk data source, a time window parameter that specifies a duration of a time window over which the bulk data is to be retrieved from the bulk data source, and data transformation parameters that specify a series of data operations for condensing the bulk data into a data metric;
using the preconfigured data connector and the connection parameters to establish the connection to the bulk data source; and
for each time interval of a series of time intervals that correspond to the time interval parameter
in response to determining that an amount of time has elapsed that corresponds to the time interval parameter, retrieving the bulk data from the bulk data source for a most-recent time window, in accordance with the time window parameter;
transforming the retrieved bulk data for the most-recent time window, in accordance with the data transformation parameters, wherein transforming the retrieved bulk data includes sequentially performing a data pre-transformation, a data aggregation, a data translation, and a data split;
based on transforming the retrieved bulk data, generating, for a data metric, a measured metric value that condenses the retrieved bulk data for the most-recent time window;
receiving, from a prediction data source, a predicted metric value for the data metric for the most-recent time window;
storing the predicted metric value for the data metric along with a series of previously predicted metric values, and storing the measured metric value for the data metric along with a series of previously measured metric values for the data metric; and
generating, for presentation on a display of a computing device, an information graphic that plots the series of previously predicted metric values relative to the series of previously measured metric values over time.

16. The computer system of claim 15, the operations further comprising:
determining a difference value based on the predicted metric value and the measured metric value; and
determining that the difference value meets or exceeds a predetermined threshold value, and in response, flagging the measured metric value as being an anomaly.

17. The computer system of claim 15, the operations further comprising including the measured metric value in training data for generating a data model that is used to generate further predicted metric values for the data metric for a plurality of future time windows.

18. A non-transitory computer-readable storage medium coupled to one or more processors and having instructions stored thereon which, when executed by the one or more processors, cause the one or more processors to perform operations comprising:
receiving configuration data for a preconfigured data connector, wherein the configuration data includes connection parameters for establishing a connection to a bulk data source, a time interval parameter that specifies how often bulk data is to be retrieved from the bulk data source, a time window parameter that specifies a duration of a time window over which the bulk data is to be retrieved from the bulk data source, and data transformation parameters that specify a series of data operations for condensing the bulk data into a data metric;
using the preconfigured data connector and the connection parameters to establish the connection to the bulk data source; and
for each time interval of a series of time intervals that correspond to the time interval parameter
in response to determining that an amount of time has elapsed that corresponds to the time interval parameter, retrieving the bulk data from the bulk data source for a most-recent time window, in accordance with the time window parameter;
transforming the retrieved bulk data for the most-recent time window, in accordance with the data transformation parameters, wherein transforming the retrieved bulk data includes sequentially performing a data pre-transformation, a data aggregation, a data translation, and a data split;
based on transforming the retrieved bulk data, generating, for a data metric, a measured metric value that condenses the retrieved bulk data for the most-recent time window;

receiving, from a prediction data source, a predicted metric value for the data metric for the most-recent time window;

storing the predicted metric value for the data metric along with a series of previously predicted metric values, and storing the measured metric value for the data metric along with a series of previously measured metric values for the data metric; and generating, for presentation on a display of a computing device, an information graphic that plots the series of previously predicted metric values relative to the series of previously measured metric values over time.

19. The non-transitory computer-readable storage medium of claim 18, the operations further comprising:

determining a difference value based on the predicted metric value and the measured metric value; and determining that the difference value meets or exceeds a predetermined threshold value, and in response, flagging the measured metric value as being an anomaly.

20. The non-transitory computer-readable storage medium of claim 18, the operations further comprising including the measured metric value in training data for generating a data model that is used to generate further predicted metric values for the data metric for a plurality of future time windows.

\* \* \* \* \*